US007884144B2

(12) United States Patent
Smith et al.

(10) Patent No.: US 7,884,144 B2
(45) Date of Patent: Feb. 8, 2011

(54) HYDRATE INHIBITED LATEX FLOW IMPROVER

(75) Inventors: Kenneth W. Smith, Tonkawa, OK (US); Wayne R. Dreher, Jr., Katy, TX (US); Timothy L. Burden, Ponca City, TX (US)

(73) Assignee: ConocoPhillips Company, Houston, TX (US)

( * ) Notice: Subject to any disclaimer, the term of this patent is extended or adjusted under 35 U.S.C. 154(b) by 133 days.

(21) Appl. No.: 12/469,541

(22) Filed: May 20, 2009

(65) Prior Publication Data

US 2010/0130681 A1 May 27, 2010

Related U.S. Application Data

(63) Continuation-in-part of application No. 11/460,689, filed on Jul. 28, 2006, now abandoned.

(51) Int. Cl.
*C09K 3/00* (2006.01)

(52) U.S. Cl. ...................................................... 523/175

(58) Field of Classification Search .................. 523/175
See application file for complete search history.

(56) References Cited

U.S. PATENT DOCUMENTS

| | | | | |
|---|---|---|---|---|
| 3,857,402 | A | 12/1974 | Schuh | |
| 4,881,566 | A | 11/1989 | Ubels et al. | |
| 5,639,925 | A | 6/1997 | Sloan et al. | |
| 5,993,608 | A | 11/1999 | Abry et al. | |
| 6,723,683 | B2 | 4/2004 | Crossman et al. | |
| 6,825,290 | B2 * | 11/2004 | Adam et al. | 526/75 |
| 2002/0065352 | A1 | 5/2002 | Johnston et al. | |
| 2003/0191030 | A1 | 10/2003 | Blair et al. | |
| 2004/0216780 | A1 | 11/2004 | Hammonds et al. | |
| 2005/0049327 | A1 | 3/2005 | Jovancicevic et al. | |
| 2006/0144595 | A1 | 7/2006 | Milligan et al. | |
| 2006/0148928 | A1 | 7/2006 | Harris et al. | |

* cited by examiner

*Primary Examiner*—Edward J Cain

(57) ABSTRACT

A process in which a mixture is agitated in a substantially oxygen-free environment to produce an agitated emulsion. The mixture comprises water, one or more surfactants, a hydrate inhibitor, and a monomer. The monomer is then polymerized in the emulsion using an initiator and a catalyst to form a hydrate inhibited latex drag reducer.

12 Claims, 4 Drawing Sheets

HYDRATE INHIBITED LATEX FLOW IMPROVER

CROSS-REFERENCE TO RELATED APPLICATIONS

Continuation-in-part application of application Ser. No. 11/460,689 filed on Jul. 28, 2006 now abandoned.

STATEMENT REGARDING FEDERALLY SPONSORED RESEARCH OR DEVELOPMENT

None

FIELD OF THE INVENTION

Process for creating hydrate inhibited latex drag reducer during an emulsion polymerization batch process.

BACKGROUND OF THE INVENTION

A variety of drag reducers have been used in the past to reduce pressure loss associated with turbulent flow of a fluid through a pipeline. Ultra-high molecular weight polymers are known to function well as drag reducers. In general, increasing the molecular weight and concentration of the polymer in the drag reducer increases the effectiveness of the drag reducer, with the limitation that the polymer must be capable of dissolving into the host fluid. However, drag reducers containing large concentrations of high molecular weight polymers generally can not be transported through small lines over large distances because certain types of drag reducers with high viscosities (e.g., gel-type drag reducers) require unacceptably high delivery line pressures and other types of drag reducers containing polymer particles (e.g., suspension-type drag reducers) can plug the delivery lines. In the past, gel and suspension drag reducers have not been delivered to subsea locations because economical subsea delivery would require passage through long conduits having small diameters.

It has recently been discovered that certain types of latex drag reducers can be effectively transported through long conduits having small diameters because such drag reducers have a relatively low viscosity and contain relatively small particles of the drag-reducing polymer. However, the presence of water in latex drag reducers presents a potential drawback for implementing such drag reducers in applications where they might come into contact with natural gas under conditions of low temperature and/or high pressure (e.g., subsea conditions). When a water-containing latex drag reducer contacts natural gas at low temperatures and/or high pressures, natural gas hydrates may form. If gas hydrates form in the conduit carrying the drag reducer, the conduit can become plugged. Thus, water-containing latex drag reducers have not been employed for subsea applications where they might come into contact with natural gas at low temperatures and high pressures.

SUMMARY OF THE INVENTION

A process in which a mixture is agitated in a substantially oxygen-free environment to produce an agitated emulsion. The mixture comprises water, one or more surfactants, a hydrate inhibitor, and a monomer. The monomer is then polymerized in the emulsion using an initiator and a catalyst solution to form a hydrate inhibited latex drag reducer.

In another embodiment, the a mixture is agitated in a substantially oxygen-free environment to product an agitated emulsion. The mixture comprises water, a surfactant comprising a high HLB anionic surfactant and a high HLB non-ionic surfactant, at least about 25% of a glycol in a carrier mixture of water and glycol, a methacrylate or acrylate monomer and a amount of buffer necessary to achieve a pH from 6.5 to 10 in the emulsion. The agitation does not cause any precipitation and occurs at a temperature that can range from the freezing point of the mixture to 60° C. The agitated emulsion is then polymerized with a catalyst solution to form a hydrate inhibited latex drag reducer were the catalyst solution comprises an accelerator and a solution for generating free radicals. In this embodiment the hydrate inhibited latex drag reducer does not precipitate after five consecutive freeze/thaw cycles.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Figure 1:
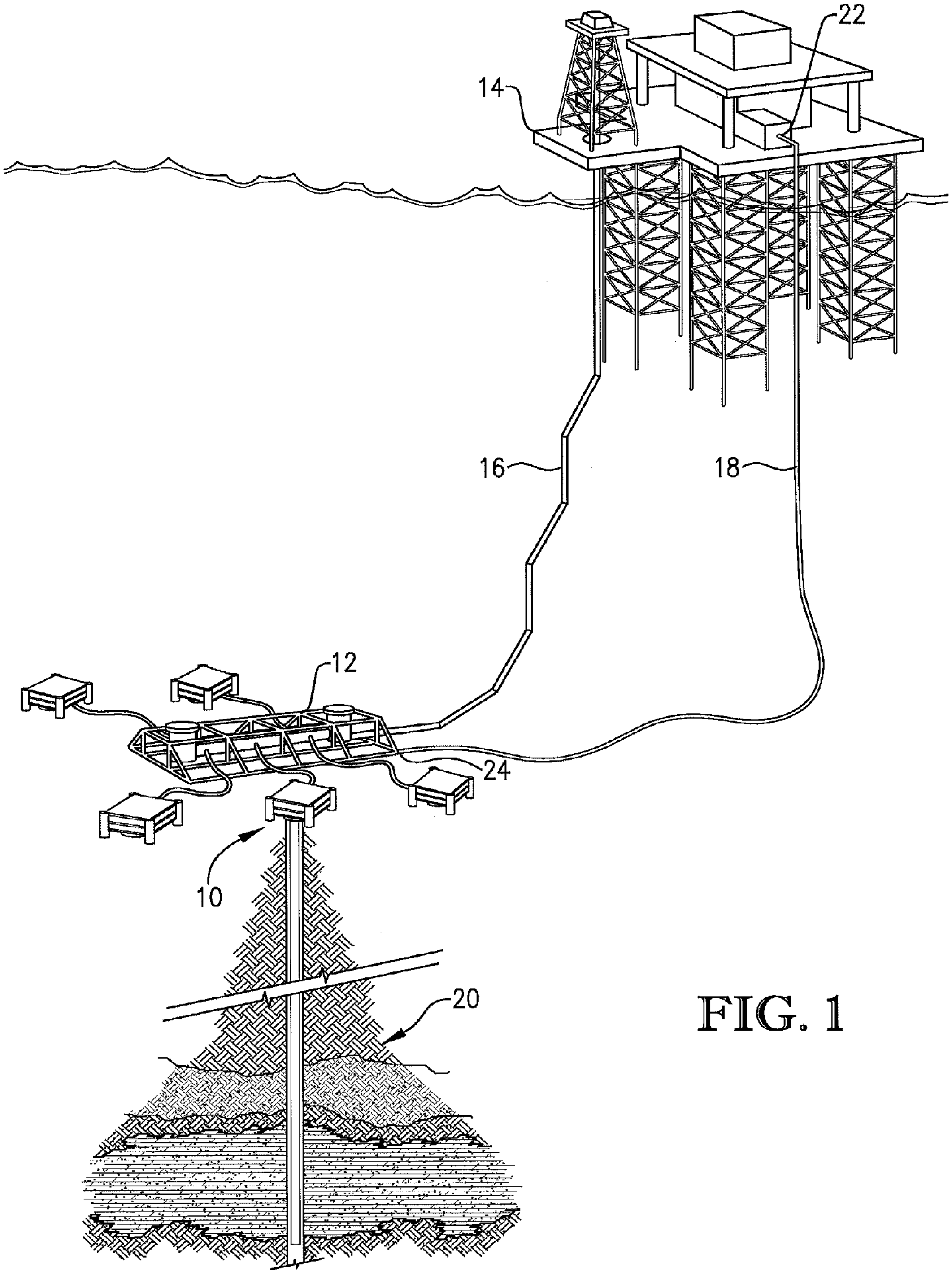
FIG. 1 is a simplified depiction of an offshore production system including a plurality of subsea wells connected to a common production manifold which is tied back to an offshore platform via a subsea flowline, particularly illustrating an umbilical line running from the offshore platform to the production manifold.

Referring initially to FIG. 1, a simplified offshore production system is illustrated as including a plurality of subsea wells 10, a common production manifold 12, an offshore platform 14, a subsea flowline 16, and an umbilical line 18. Each well 10 is operable to extract a hydrocarbon-containing fluid from a subterranean formation 20. In one embodiment of the present invention, the hydrocarbon-containing fluid produced by wells 10 contains oil and/or natural gas. For example, the hydrocarbon-containing fluid can contain at least about 10, at least about 25, or at least 50 weight percent crude oil. The hydrocarbon-containing fluids produced by each well 10 can be combined in production manifold 12 and thereafter transported via flowline 16 to platform 14. A first end 22 of umbilical line 18 is connected to a control facility on platform 14, while a second end 24 of umbilical line 18 is connected to wells 10, manifold 12, and/or flowline 16.

Figure 2:
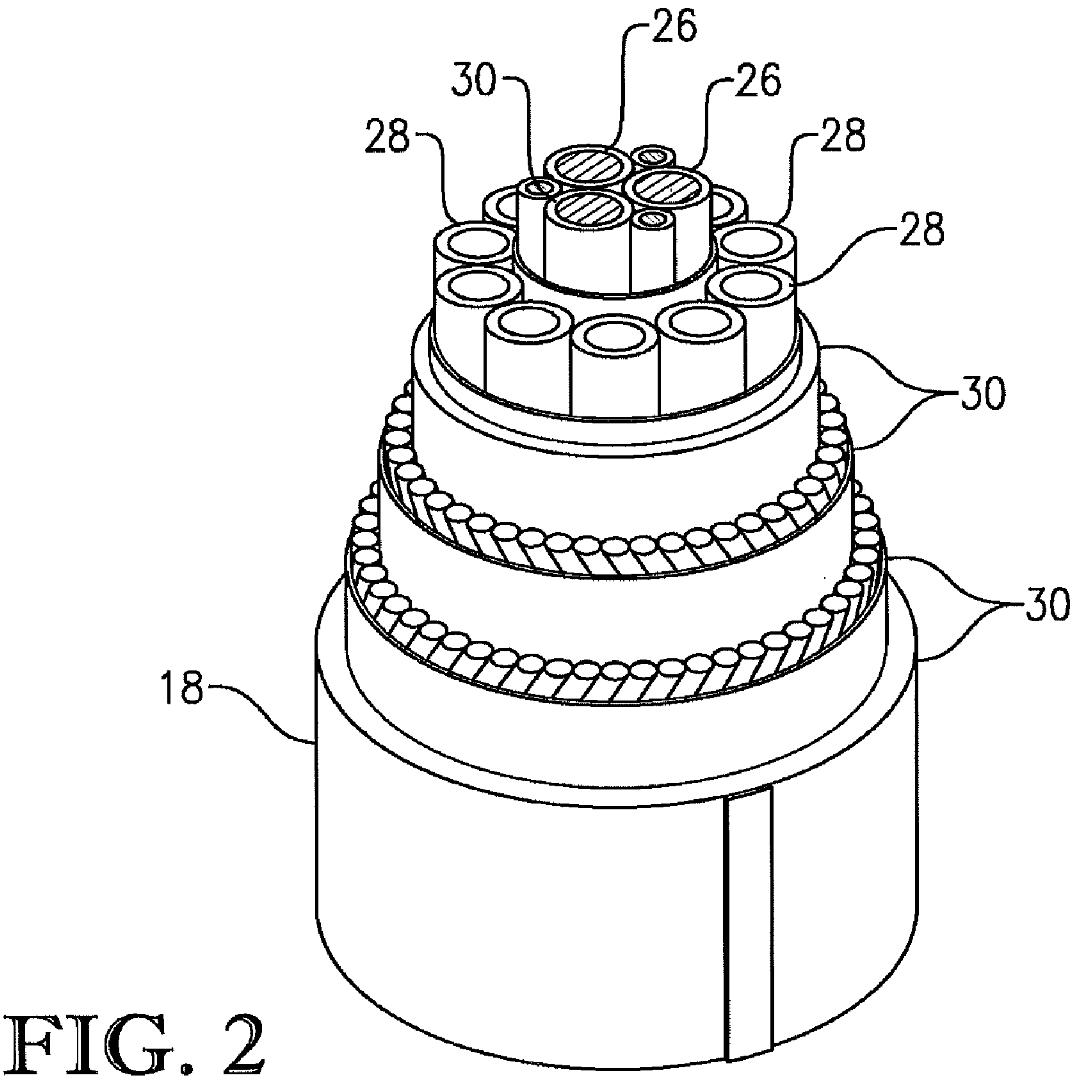
FIG. 2 is a partial cut-away view of an umbilical line, particularly illustrating the various electrical and fluid conduits contained in the umbilical line.

Referring now to FIG. 2, umbilical line 18 can include a plurality of electrical conduits 26, a plurality of fluid conduits 28, and a plurality of protective layers 30 surrounding electrical conduits 26 and fluid conduits 28. Referring to FIGS. 1 and 2, electrical conduits 26 can carry power from platform 14 to wells 10 and/or manifold 12. Fluid conduits 28, commonly referred to as chemical injection lines, are typically used to inject low-viscosity flow assurance chemicals into the produced hydrocarbon-containing fluids transported back to platform 14 via flowline 16. Typical flow assurance chemicals that are injected through fluid conduits 28 include, but are not limited to, corrosion inhibitors, paraffin inhibitors, scale inhibitors, biocides, demulsifiers, hydrogen sulfide scavengers, oxygen scavengers, water treatments, and asphaltene inhibitors. The length of umbilical line 18 and flowline 16 can be at least about 500 feet, at least about 1,000 feet, or in the range of from 5,000 feet to 30 miles. The average inside diameter of each fluid conduit 28 can be about 5 inches or less, about 2.5 inches or less, about 1 inch or less, about 0.5 inches or less, or 0.25 inches or less.

In accordance with one embodiment of the present invention, a drag reducer, described in detail below, is transported through at least one fluid conduit 28 of umbilical line 18. After being transported through fluid conduit 28, the drag reducer can be introduced into the hydrocarbon-containing host fluid originating from subterranean formation 20. The subsea location where the drag reducer is introduced into the hydrocarbon-containing host fluid can be in flowline 16, in manifold 12, and/or in each individual well 10, as described in further detail below.

Generally, the temperature of the drag reducer during transportation through fluid conduit 28 is relatively low due to the cool subsea environment around umbilical line 18. Further, the pressure at which the drag reducer is transported through fluid conduit 28 is relatively high due to the static head and line back pressure. In one embodiment, the drag reducer can be injected into the hydrocarbon-containing host fluid at a subsea location where the temperature is in the range of from about 25 to about 100° F., about 30 to about 75° F., or 35 to 50° F., and the pressure is in the range of from about 500 to about 10,000 psia, about 500 to about 7,500 psi, or 1,000 to 5,000 psia. In one embodiment, the temperature at the subsea location where the drag reducer is injected into the hydrocarbon-containing host fluid is at least about 10, about 20, or 30° F. lower than the gas hydrate formation temperature of distilled water at the pressure of the subsea injection location. Typically, the temperature of the drag reducer at the point of introduction into the host fluid will be the minimum temperature of the drag reducer in fluid conduit 28 of umbilical line 18, while the pressure of the drag reducer at the point of introduction into the produced fluid will be the maximum pressure of the drag reducer in fluid conduit 28 of umbilical line 18. Drag reducers capable of implementation in the present invention, can possess physical properties that allow them to be pumped through fluid conduit 28 of umbilical line 18 at typical operating conditions with a pressure drop of less than about 5 psi (pounds per square inch) per foot, less than about 2.5 psi per foot, or less than 1 psi per foot.

Figure 3:
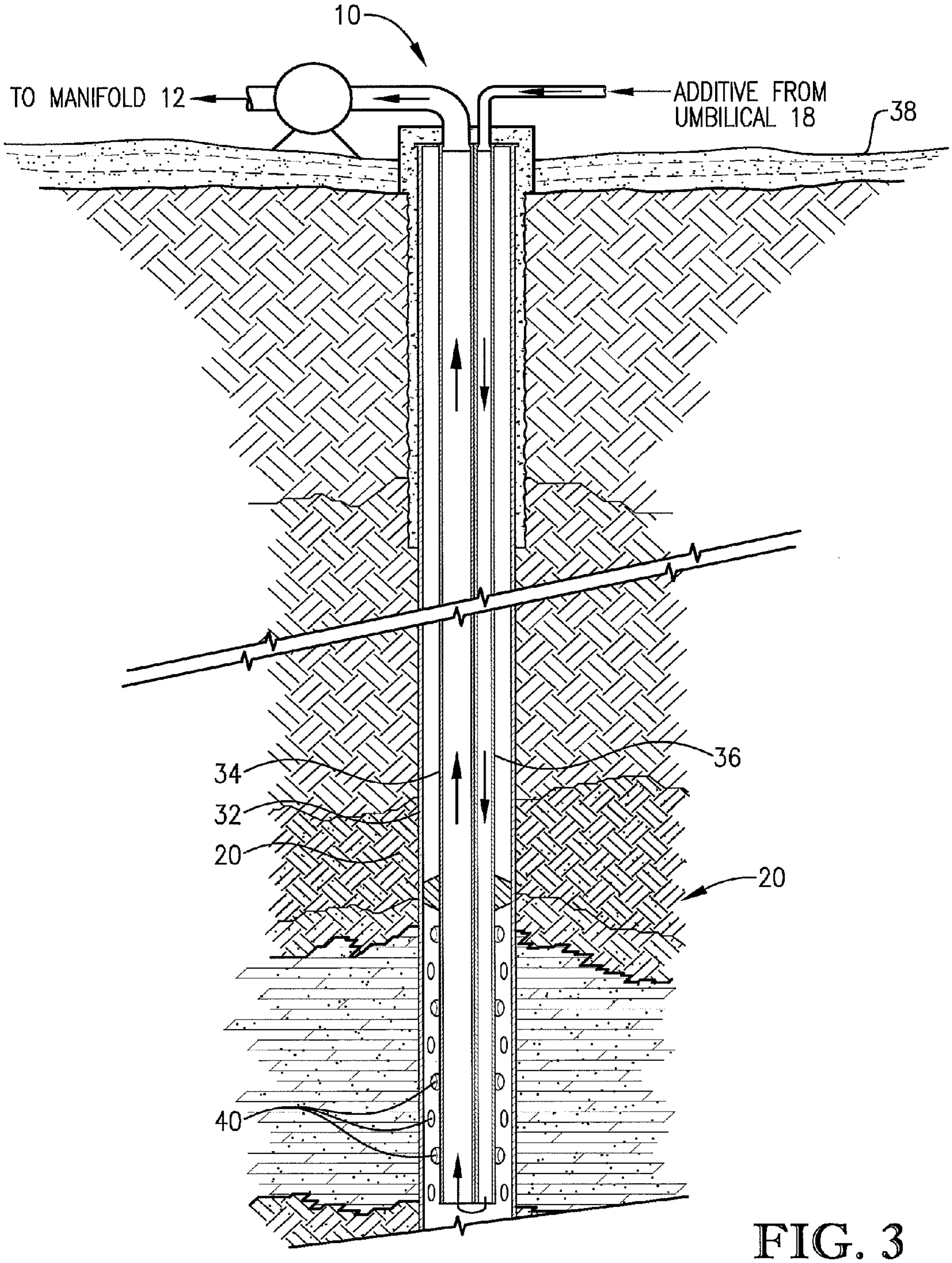
FIG. 3 is a simplified depiction of a subsea wellbore used to produce a fluid from a subterranean formation, where the well is equipped with an additive delivery conduit for the downhole introduction of one or more additives, which can contain a hydrate inhibited drag reducer, into the produced fluid prior to transporting the fluid to the ground surface.

FIG. 3 illustrates an embodiment of the present invention where the drag reducer is introduced into the hydrocarbon-containing host fluid at a downhole location. As shown in FIG. 3, well 10 can include an outer casing 32, an inner production tubing 34, and an additive injection conduit 36. During operation of well 10, an additive containing a drag reducer and provided by umbilical line 18 is transported downhole via additive injection conduit 36. The drag reducer contained in the additive will be described in detail below. The additive can comprise at least about 10, at least about 50, at least about 75, or at least 90 weight percent drag reducer. In one embodiment, the additive consists essentially of the drag reducer alone. In another embodiment, the additive contains the drag reducer in combination with one or more conventional flow assurance chemicals. The additive can comprise in the range of from about 5 to about 75 weight percent of drag-reducing polymer particles, in the range of from about 10 to about 60 weight percent of drag-reducing polymer particles, or in the range of from 15 to 45 weight percent of drag-reducing polymer particles.

Referring again to FIG. 3, during operation of well 10, the hydrocarbon-containing host fluid passes from subterranean formation 20, through perforations 40 in outer casing 32, and into the inside of casing 32, where it is combined with the additive to thereby produce a combined/treated fluid comprising the drag reducer and the host fluid. The resulting treated fluid can thereafter be transported upwardly through production tubing 34 to or near the seafloor 38.

The amount of drag reducer combined with the hydrocarbon-containing host fluid can be expressed in terms of concentration of drag-reducing polymer in the hydrocarbon-containing liquid component of the host fluid. The concentration of the drag-reducing polymer in the hydrocarbon-containing liquid component can be in the range of from about 0.1 to about 500 ppmw, in the range of from about 0.5 to about 200 ppmw, in the range of from about 1 to about 100 ppmw, or in the range of from 2 to 50 ppmw. When the additive is introduced into the hydrocarbon-containing host fluid, at least about 50 weight percent, at least about 75 weight percent, or at least 95 weight percent of the drag-reducing polymer particles can be dissolved by the host fluid.

Referring to FIGS. 1 and 3, after being brought to or near seafloor 38, the treated fluid can be transported to manifold 12 and ultimately to offshore platform 14 via flowline 16. Since the treated fluid contains a drag reducer, the pressure drop associated with the flow of treated fluid through production tubing 34 and flowline 16 is reduced relative to the pressure drop that would be associated with the flow of the untreated production fluid.

In one embodiment of the present invention, the drag reducer employed in the present invention can be a latex drag reducer comprising a high molecular weight polymer dispersed in an aqueous continuous phase. The latex drag reducer can be prepared via emulsion polymerization of a reaction mixture comprising one or more monomers, a continuous phase, at least one surfactant, and an initiation system. The continuous phase generally comprises at least one component selected from the group consisting of water, polar organic liquids, and mixtures thereof. When water is the selected constituent of the continuous phase, the reaction mixture can also comprise a buffer. As further described below, the continuous phase can also comprise a hydrate inhibitor.

Post-addition of a hydrate inhibitor to the latex drag reducer is one way to make a latex drag reducer that is hydrate inhibited. However, post-addition of a hydrate inhibitor to the latex drag reducer destabilizes the polymer latex and causes the polymer to agglomerate, thus producing a material that is not easily pumpable and would plug small tubing in the injection process into the pipeline. A benefit of one embodiment of this invention is that the hydrate inhibitor is part of the emulsion polymerization process to create the latex drag reducer and is not added to the latex drag reducer after the polymerization is complete. The ability to polymerize a latex drag-reducing polymer in the presence of a hydrate inhibited carrier fluid without agglomeration of the polymer particles permits it to be pumpable through small tubing lines without having solids that would plug the line. Since the present embodiment allows for polymerization of a latex drag reducer, without agglomeration occurring due to the presence of the hydrate inhibitor, it is beneficial over a latex drag reducer in which the hydrate inhibitor is added post-polymerization. Simply post-adding a hydrate to a latex drag reducer is an acceptable method of producing a hydrated inhibited latex; however, doing so causes solids to be present and will render the drag reducer unacceptable for pumping material down injection tubing.

The monomer used to form the high molecular weight drag-reducing polymer can include, but is not limited to, one or more of the monomers selected from the group consisting of:

(A)

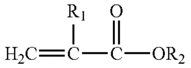

wherein $R_1$ is H or a C1-C10 alkyl radical, more preferably $R_1$ is H, $CH_3$, or $C_2H_5$, and $R_2$ is H or a C1-C30 alkyl radical, more preferably $R_2$ is a C4-C18 alkyl radical, and is most preferably represented by formula (i) as follows (i)

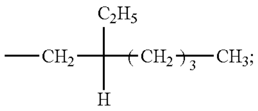

(B)

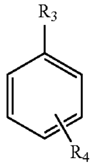

wherein $R_3$ is $CH{=}CH_2$ or $CH_3{-}C{=}CH_2$ and $R_4$ is H or a C1-C30 alkyl radical, more preferably $R_4$ is H or a C4-C18 alkyl radical, a phenyl ring with 0-5 substituents, a naphthyl ring with 0-7 substituents, or a pyridyl ring with 0-4 substituents;

(C)

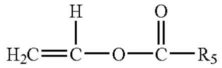

wherein $R_5$ is H or a C1-C30 alkyl radical, and preferably $R_5$ is a C4-C18 alkyl radical;

(D)

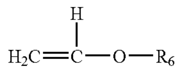

wherein $R_6$ is H or a C1-C30 alkyl radical, preferably $R_6$ is a C4-C18 alkyl radical;

(E)

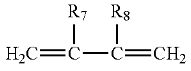

wherein $R_7$ is H or a C1-C18 alkyl radical, more preferably $R_7$ is H or a C1-C6 alkyl radical, and $R_8$ is H or a C1-C18 alkyl radical, more preferably $R_8$ is H or a C1-C6 alkyl radical, and most preferably $R_8$ is H or $CH_3$, also, the $H_2$'s on the 1 and 4 carbons depicted above could be replaced by C1-C18 alkyl radicals or C1-C6 alkyl radicals;

(F)

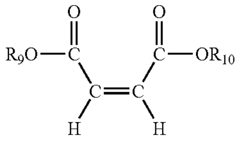

maleates such as wherein $R_9$ and $R_{10}$ are independently H, C1-C30 alkyl, aryl, cycloalkyl, or heterocyclic radicals;

(G)

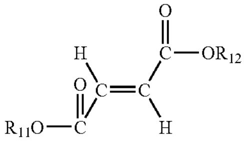

fumarates such as wherein $R_{11}$ and $R_{12}$ are independently H, C1-C30 alkyl, aryl, cycloalkyl, or heterocyclic radicals;

(H)

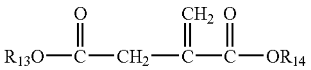

itaconates such as wherein $R_{13}$ and $R_{14}$ are independently H, C1-C30 alkyl, aryl, cycloalkyl, or heterocyclic radicals;

(I)

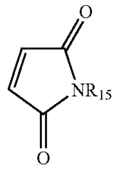

maleimides such as wherein $R_{15}$ is H, a C1-C30 alkyl, aryl, cycloalkyl, or heterocyclic radical.

In one embodiment, monomers of formula (A) are preferred, especially methacrylate monomers of formula (A), and most especially 2-ethylhexyl methacrylate monomers of formula (A). In another embodiment the monomer can be a combination of 2-ethylhexyl methacrylate and n-butyl acrylate.

The surfactant used in the reaction mixture can include at least one high HLB anionic or nonionic surfactant. The term "HLB number" refers to the hydrophile-lipophile balance of a surfactant in an emulsion. The HLB number is determined by the method described by W. C. Griffin in J. Soc. Cosmet. Chem., 1, 311 (1949) and J. Soc. Cosmet. Chem., 5, 249 (1954), which is incorporated by reference herein. As used herein, "high HLB" shall denote an HLB number of 7 or more. The HLB number of surfactants for use with forming the reaction mixture can be at least about 8, about 10, or 12.

Exemplary high HLB anionic surfactants include high HLB alkyl sulfates, alkyl ether sulfates, dialkyl sulfosuccinates, alkyl phosphates, alkyl aryl sulfonates, and sarcosinates. Commercial examples of high HLB anionic surfactants include sodium lauryl sulfate (available as RHODAPON™ LSB from Rhodia Incorporated, Cranbury, N.J.), dioctyl sodium sulfosuccinate (available as AEROSOL™ OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX™ 40 from Norman, Fox & Co., Vernon, Calif.), and sodium lauroylsarcosinic (available as HAMPOSYL™ L-30 from Hampshire Chemical Corp., Lexington, Mass.).

Exemplary high HLB nonionic surfactants include high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Commercial examples of high HLB nonionic surfactants include nonylphenoxy and octylphenoxy poly(ethyleneoxy)ethanols (available as the IGEPAL™ CA and CO series, respectively from Rhodia, Cranbury, N.J.), C8 to C18 ethoxylated primary alcohols (such as RHODASURF™ LA-9 from Rhodia Inc., Cranbury, N.J.), C11 to C15 secondary-alcohol ethoxylates (available as the TERGITOL™ 15-S series, including 15-S-7, 15-S-9, 15-S-12, from Dow Chemical Company, Midland, Mich.), polyoxyethylene sorbitan fatty acid esters (available as the TWEEN™ series of surfactants from Uniquema, Wilmington, Del.), polyethylene oxide (25) oleyl ether (available as SIPONIC™ Y-500-70 from Americal Alcolac Chemical Co., Baltimore, Md.), alkylaryl polyether alcohols (available as the TRITON™ X series, including X-100, X-165, X-305, and X-405, from Dow Chemical Company, Midland, Mich.).

The initiation system for use in the reaction mixture can be any suitable materials/solutions for generating free radicals necessary to facilitate emulsion polymerization. Any of these materials/solutions can be added to the process as solids are in solution as the process requires. Possible initiators include persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible catalysts include, but are not limited to, any composition containing a transition metal having two oxidation states such as, for example, ferrous sulfate and ferrous ammonium sulfate. Alternatively, known thermal and radiation initiation techniques can be employed to generate the free radicals.

When water is used to form the reaction mixture, the water can be a purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor being present in the reaction mixture allows for having a latex drag reducer with no agglomerate present which could cause pluggage of small injection tubes. In addition, the hydrate inhibitor being present in the reaction mixtures does not have a negative effect on the molecular weight of the polymer and yet does provide sufficient hydrate inhibition for a variety of production applications. The hydrate inhibitor also allows the latex drag reducer to be freeze-thaw stable and decreases the freezing point of the mixture. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include different types of glycols. Examples of such glycols include but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150° F., about 20 to about 80° F., or 30 to 60° F. For example, monoethylene glycol qualifies as a hydrate inhibitor because the gas hydrate formation temperature of distilled water at 2,000 psia is about 70° F., while the gas hydrate formation temperature of a 1:1 mixture of distilled water and monoethylene glycol at 2,000 psia is about 28° F. Thus, monoethylene glycol lowers the gas hydrate formation temperature of distilled water at 2,000 psia by about 42° F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

In forming the reaction mixture, the monomer, water, the at least one surfactant, and optionally the hydrate inhibitor, can be combined under a substantially oxygen-free atmosphere that is maintained at less than about 1000 ppmw oxygen, less than about 100 ppmw oxygen or less than 50 ppm oxygen. The oxygen-free atmosphere can be maintained by continuously purging the reaction vessel with an inert gas such as nitrogen and/or argon. The temperature of the system can be kept at a level from the freezing point of the continuous phase up to about 60° C., or from about 0 to about 45° C., or from 0 to 30° C. The system pressure can be maintained in the range of from about 5 to about 100 psia, or about 10 to about 25 psia, or about atmospheric. However, higher pressures up to about 300 psia can be necessary to polymerize certain monomers, such as diolefins. Next, a buffer can be added, if required, followed by addition of the initiation system, either all at once or over time. The polymerization reaction is carried out for a sufficient amount of time to achieve at least 90 percent conversion by weight of the monomers. Typically, this time period is in the range of from between about 1 to about 10 hours, or 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
|---|---|---|
| Monomer (wt. % of reaction mixture) | 10-60% | 30-50% |
| Water (wt. % of reaction mixture) | 10-80% | 20-40% |
| Surfactant (wt. % of reaction mixture) | 0.1-10% | 0.25-6% |
| Initiation System | | |
| Monomer:Initiator (molar ratio) | $1 \times 10^3$:1-$5 \times 10^6$:1 | $1 \times 10^4$:1-$2 \times 10^6$:1 |
| Monomer:Reducing Comp. (molar ratio) | $1 \times 10^3$:1-$5 \times 10^6$:1 | $1 \times 10^4$:1-$2 \times 10^6$:1 |
| Accelerator:Initiator (molar ratio) | 0.01:1-10:1 | 0.01:1-1:1 |
| Buffer | 0 to amount necessary to reach pH of initiation (initiator dependent, typically between about 6.5-10) | |
| Hydrate Inhibitor | Hydrate inhibitor to water weight ration from about 1:10 to about 10:1, about 1:5 to about 5:1, or 2:3 to 3:2 | |

The emulsion polymerization reaction yields a latex composition comprising a dispersed phase of solid polymer particles and a liquid continuous phase. The latex can be a stable colloidal dispersion comprising a dispersed phase of high molecular weight polymer particles and a continuous phase comprising water. The colloidal particles can comprise in the range of from about 10 to about 60 percent by weight of the latex, or in the range of from 30 to 50 percent by weight of the latex. The continuous phase can comprise water, the high HLB surfactant, the hydrate inhibitor (if present), and buffer as needed. Water is present in the range of from about 10 to about 80 percent by weight of the latex, or about 20 to about 40 percent by weight of the latex. The high HLB surfactant forms in the range of from about 0.1 to about 10 percent by weight of the latex, or from 0.25 to 6 percent by weight of the latex. As noted in the table above, the buffer is present in an amount necessary to reach the pH required for initiation of the polymerization reaction and is initiator dependent. Typically, the pH required to initiate a reaction is in the range of from 6.5 to 10.5, 6.5 to 7.5 or 9.5 to 10 or even 9.5 to 10.5, dependent upon the buffer system used.

When the hydrate inhibitor is employed in the reaction mixture, it can be present in the resulting latex in an amount that yields a hydrate inhibitor to water weight ratio in the range of from about 1:10 to about 10:1, about 1:5 to about 5:1, or 2:3 to 3:2.

Figure 4:
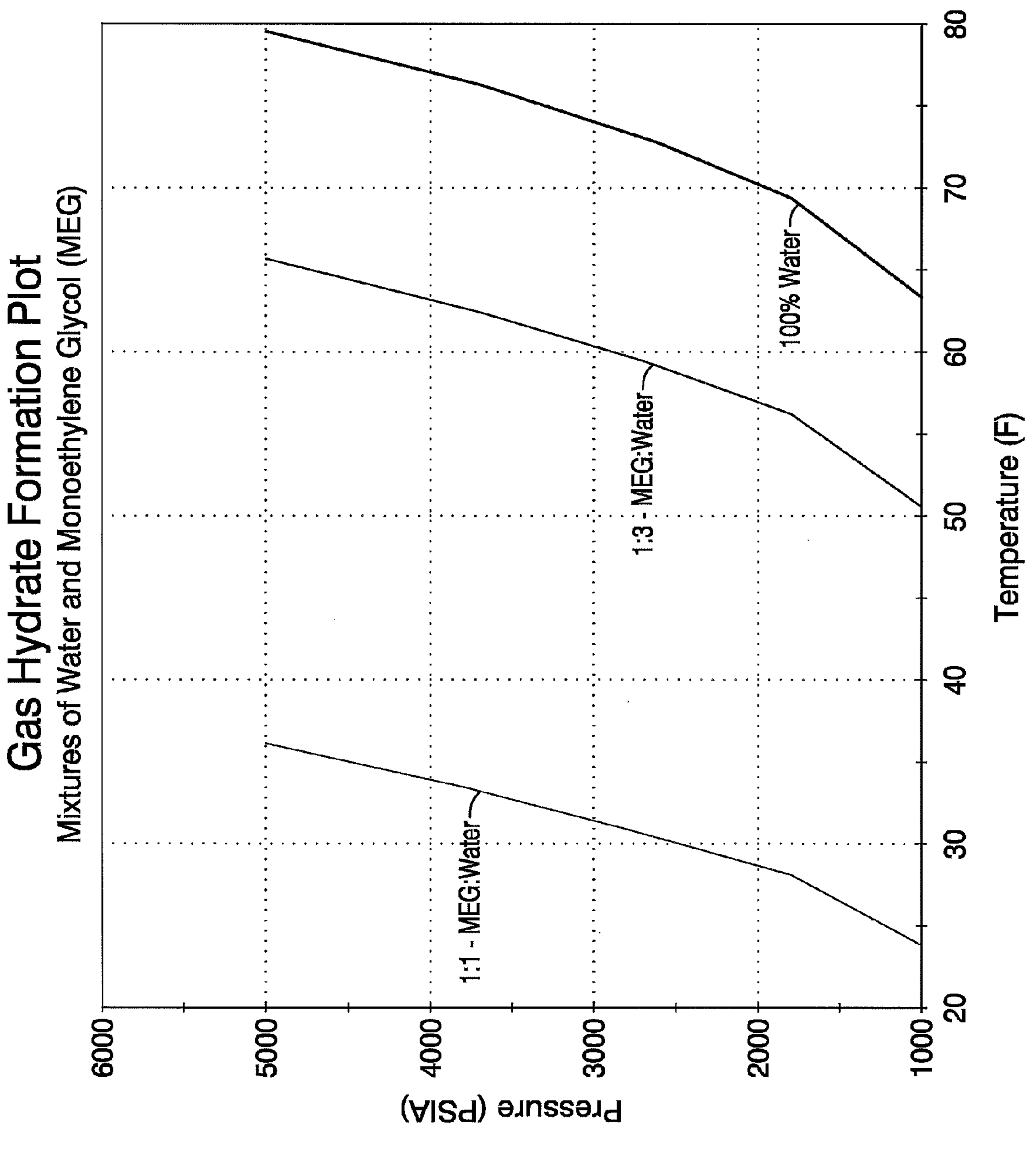
FIG. 4 is a computer-simulated gas hydrate formation plot for water and for two different mixtures of water and monethylene glycol (MEG), particularly illustrating how gas hydrate formation temperature varies with pressure and with the MEG concentration.

The specific amount of hydrate inhibitor employed in the latex can vary depending on the temperature and pressure conditions under which the latex drag reducer will be exposed to natural gas and the compositional make-up of the natural gas. Generally, the amount of hydrate inhibitor present in the latex drag reducer will be at least the minimum amount necessary to lower the gas hydrate formation temperature of the drag reducer below the temperature at which it will be contacted with natural gas at the contacting pressure. FIG. 4 provides an illustration of how temperature, pressure, and concentration of hydrate inhibitor (e.g., monoethylene glycol (MEG)) affect the formation of natural gas hydrates. The gas hydrate formation curves illustrated in FIG. 4 were developed using a proprietary computer modeling program. These gas hydrate formation curves were generated for natural gas containing 92 mole percent methane, 5 mole percent ethane, and 3 mole percent propane. In general, the curves of FIG. 4 show that the gas hydrate formation temperature decreases with decreasing pressure and increasing MEG (hydrate inhibitor) concentration.

The drag reducing polymer of the dispersed phase of the latex can have a weight average molecular weight ($M_w$) of at least about $1\times10^6$ g/mol, or at least about $2\times10^6$ g/mol, or at least $5\times10^6$ g/mol. The colloidal particles of drag reducing polymer can have a mean particle size of less than about 10 microns, less than about 1000 nm (1 micron), in the range of from about 10 to about 500 nm, or in the range of from 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The polymer of the dispersed phase can exhibit little or no branching or crosslinking. The continuous phase can have a pH in the range of from about 4 to about 10, or from about 6 to about 8, and contains few if any multi-valent cations.

In order for the polymer to function as a drag reducer, the polymer should dissolve or be substantially solvated in the produced fluid (e.g., crude oil and/or water). The efficacy of the high molecular weight polymer particles as drag reducers when added directly to the produced fluid is largely dependent upon the temperature of the produced fluid. For example, at lower temperatures, the polymer dissolves at a lower rate in the produced fluid, therefore, less drag reduction can be achieved. However, when the temperature of the produced fluid is above about 30° C. or above 40° C., the polymer is more rapidly solvated and appreciable drag reduction is achieved.

The drag reducer employed in the present invention should be relatively stable so that it can be stored for long periods of time and thereafter employed as an effective drag reducer without further modification. As used herein, "shelf stability" shall denote the ability of a colloidal dispersion to be stored for significant periods of time without a significant amount of the dispersed solid phase dissolving in the liquid continuous phase. The modified drag reducer can exhibit a shelf stability such that less than about 25, about 10, or 5 weight percent of the particles of high molecular weight polymer dissolves in the continuous phase over a 6-month storage period, where the modified drag reducer is stored without agitation at standard temperature and pressure (STP) during the 6-month storage period.

The drag reducers employed in the present invention can provide significant percent drag reduction (% DR). For example, the drag reducers can provide at least about a 5 percent drag reduction, at least about 15 percent drag reduction, or at least 20 percent drag reduction. Percent drag reduction and the manner in which it is calculated are more fully described in Example 3, below.

EXAMPLES

Example 1

Preparation of Hydrate-Inhibited Latex Drag Reducer

In this example, a hydrate-inhibited drag-reducing latex was prepared by polymerizing 2 ethylhexyl methacrylate in an emulsion comprising water, surfactant, initiator, and a buffer.

The polymerization was performed in a 1000 mL jacketed reaction kettle with a condenser, mechanical stirrer, thermocouple, septum ports, and nitrogen inlets/outlets.

The kettle was charged with 200.00 grams of 2-ethylhexyl methacrylate (monomer), 140.82 grams of ethylene glycol (hydrate inhibitor), 93.88 grams of distilled water, 18.80 grams of Polystep™ B-5 (surfactant, available from Stepan Company of Northfield, Ill.), 20.00 grams of Tergitol™ 15-S-7 (surfactant, available from Dow Chemical Company of Midland, Mich.), 0.57 grams of potassium phosphate monobasic (pH buffer), 0.44 grams of potassium phosphate dibasic (pH buffer), and 0.001 grams of ferrous ammonium sulfate (polymerization accelerator).

The mixture was agitated using a blade type stirrer at 400 rpm to emulsify the monomer in the water, glycol, and surfactant carrier. The mixture was then purged with nitrogen to remove any traces of oxygen in the reactor and cooled to about 41° F.

The polymerization reaction was initiated by adding into the reactor 10.0 mL of a solution of ammonium persulfate (0.0322 grams of ammonium persulfate dissolved in 10 mL of distilled water) at a rate of 1.00 mL per hour and 10.0 mL of a solution of sodium formaldehyde sulfoxylate (0.0224 grams of sodium formaldehyde sulfoxylate dissolved in 10.0 mL of distilled water) at a rate of 1.00-mL per hour using a syringe pump via small-bore tubing. The polymerization reaction was carried out with agitation for about 16 hours.

Example 2

Preparation of Latex Drag Reducer without Hydrate Inhibitor

In this example, a drag-reducing latex was prepared by polymerizing 2-ethylhexyl methacrylate in an emulsion comprising water, surfactant, initiator, and a buffer.

The polymerization was performed in a 300 mL jacketed reaction kettle with a condenser, mechanical stirrer, thermocouple, septum ports, and nitrogen inlets/outlets.

The kettle was charged with 0.231 g of disodium hydrogenphosphate, 0.230 g of potassium dihydrogenphosphate, and 4.473 g of sodium dodecyl sulfonate. The kettle was purged with nitrogen overnight. Next, the kettle was charged with 125 g of deoxygenated HPLC-grade water, the kettle contents were stirred at 300 rpm, and the kettle temperature set to 5° C. using the circulating bath. The 2-ethylhexyl methacrylate monomer (100 mL, 88.5 g) was then purified to remove any polymerization inhibitor present, deoxygenated (by bubbling nitrogen gas through the solution), and transferred to the kettle.

In this example, four initiators were prepared for addition to the kettle: an ammonium persulfate (APS) solution by dissolving 0.131 g of APS in 50.0 mL of water; a sodium formaldehyde sulfoxylate (SFS) solution by dissolving 0.175 g of SFS in 100.0 mL of water; a ferrous sulfate solution by dissolving 0.021 g of FeSO4.7H2O in 10.0 mL water; and a tert-butyl hydroperoxide (TBHP) solution by dissolving 0.076 g of 70% TBHP in 50.0 mL of water.

The kettle was then charged with 1.0 mL of ferrous sulfate solution and over a two hour period, 1.0 mL of APS solution and 1.0 mL of SFS solution were added concurrently. Following APS and SFS addition, 1.0 mL of TBHP solution and 1.0 mL of SFS solution were added concurrently over a two hour period.

The final latex was collected after the temperature cooled back to the starting temperature. The final latex (216.58 g) comprised 38.3% polymer and a small amount of coagulum (0.41 g).

Example 3

Drag Reduction Measurements of Hydrate-Inhibited Latex Drag Reducer and Non-Hydrate Inhibited Latex Drag Reducer Flow loop testing was performed to evaluate the effectiveness of the latex as a drag reducer. Percent drag reduction (% DR) was measured in a 100-ft long, 1-inch nominal pipe (0.957-inch inner diameter) containing diesel fuel flowing at 9.97 gallons per minute. Prior to testing, the latex was added to a mixture of 3 parts kerosene to 2 parts isopropyl alcohol by mass and slowly dissolved under low shear conditions to make a polymeric solution that contains 0.43 to 0.45% polymer by mass. The solution was injected at a rate of 16.8 mL/min into the diesel in the flow loop. This corresponded to 1.8 to 2.0 ppm by mass concentration in the diesel. The diesel volumetric flow rate was held constant during the test, and frictional pressure drop is measured over the 100-foot pipe with no drag reducer present and with drag reducer present. Percent drag reduction was calculated from the pressure measurements as follows:

$$\%\ DR = \frac{\Delta P_{baseline} - \Delta P_{treated}}{\Delta P_{baseline}} \times 100\%$$

where $\Delta P_{baseline}$=frictional pressure drop with no drag reducer treatment $\Delta P_{treated}$=frictional pressure drop with drag reducer treatment.

The composition from Example 1 was tested by the above-described method and resulted in 28% DR. The composition from Example 2 was tested in the same manner and resulted in 25% DR.

Example 4

Measurement of Hydrate Formation in Hydrate-Inhibited Latex Drag Reducer

The composition from Example 1 was submitted for hydrate formation testing by placing 20 mL of the latex into a pressure cell followed by 32 $cm^3$ of a synthetic natural gas (92% methane 5% ethane, and 3% propane, all mole percents) at 4000 psig. The cell is fitted with a small transparent window so that the contents can be visually observed.

The cell was then cooled to 40° F. and left at this temperature for a period of 24 hours. The pressure in the cell is maintained at 4,000 psig through the use of a piston in the cell. The volume of the cell decreases significantly if hydrates form (as the natural gas is absorbed into the fluid) and the piston moves to keep the cell pressure at 4000 psig. No change in the volume of the cell during the 24 hour test was observed. No visible indication of gas hydrate formation was observed through the viewing window.

Example 5

Measurement of Hydrate Formation in Latex Drag Reducer without Hydrate Inhibitor The composition from Example 2 was submitted for hydrate formation testing by placing 20 mL of the latex into a pressure cell followed by 32 $cm^3$ of a synthetic natural gas (92% methane 5% ethane, and 3% propane, all mole percents) at 4000 psig. The cell is fitted with a small transparent window so that the contents can be visually observed.

The cell was then cooled to 40° F. and left at this temperature for a period of 24 hours. The pressure in the cell is maintained at 4,000 psig through the use of a piston in the cell. The volume of the cell decreases significantly if hydrates form (as the natural gas is absorbed into the fluid) and the piston moves to keep the cell pressure at 4000 psig. A significant change in the volume of the cell was observed during the 24 hour test. Visible indication of gas hydrate formation was observed through the viewing window.

Example 6

In this example, a hydrate-inhibited drag-reducing latex was prepared by polymerizing 2-ethylhexyl methacrylate in an emulsion polymerization batch process with 10% ethylene glycol in continuous phase of water and ethylene glycol.

The polymerization was performed in a substantially oxygen-free 1000 mL jacketed reaction kettle with a condenser, mechanical stirrer, thermocouple, septum ports, and nitrogen inlets/outlets.

The kettle was charged with 200.00 grams of 2-ethylhexyl methacrylate, 23.47 grams of ethylene glycol, 211.23 grams of distilled water, 18.80 grams of sodium lauryl sulfate, 20.00 grams of a nonionic secondary alcohol ethoxylate, 10 grams of an ammonium persulfate solution (0.133 grams of ammonium persulfate dissolved into 40.00 grams of distilled water) and an amount of phosphate buffer necessary to achieve a pH between 6.5 and 10. In this situation the amount of phosphate buffer necessary was 6.5 grams (the phosphate buffer is composed of 87 grams of potassium dihydrogen phosphate and 68 grams of potassium hydrogen phosphate dissolved into 1.0 liter of distilled water).

The mixture was agitated for a minimum of four hours using a blade type stirrer at 400 rpm to emulsify the components at a temperature of 5° C.

A catalyst solution was prepared by dissolving a source of ferrous ion (ferrous ammonium sulfate, hexahydrate) into a dilute (0.01 M) sulfuric acid solution. The solution contained 0.1428 grams of ferrous ammonium sulfate hexahydrate dissolved into 200 mL of 0.01M sulfuric acid.

9.40 mL of the catalyst solution was injected via a syringe pump at 470 μl/hr and left to react for 16 hours. It was observed from this reaction that no precipitate was formed.

The following table depicts different formulations of a hydrate-inhibited drag-reducing latex with differing amounts of ethylene glycol. These formulations created using the same procedures as example 6 only changing the amounts of ethylene glycol and water.

| % ethylene glycol | % monomer conversion | % drag reducing | Precipitation |
|---|---|---|---|
| 10% | 96.2% | 26.9% | None |
| 20% | 97.2% | 25.9% | None |
| 30% | 96.2% | 29.1% | None |
| 40% | 97.8% | 26.8% | None |
| 50% | 96.75% | 28.1% | None |
| 60% | 98.58% | 28.8% | None |

The following table depicts different types and quantities of glycols that can be used in addition to ethylene glycol to form a hydrate-inhibited drag-reducing latex. These formulations were created using the same principles as example 6 only changing the amounts and type of glycol used and the amount of water used. When referring to the freeze/thaw stability, the test refers to the ability for a hydrate-inhibited drag-reducing latex to show stability after a freeze thaw test.

A freeze thaw test is commonly conducted by placing a sample of latex into a glass bottle and lowering its temperature from room temperature to −100° F. in a dry ice/acetone bath over the course of two hours. It is then removed from the dry ice/acetone bath and allowed to warm up to room temperature without any external heating. The latex is considered stable if it does not have any significant agglomeration of polymer, precipitate (that can be determined by filtration), globulars, coagulation, or any significant change in viscosity.

| Glycol Type | Percentage of glycol | Freeze/Thaw | Precipitation |
|---|---|---|---|
| Ethylene Glycol | 0% | Fail | None |
| Propylene Glycol | 10% | Fail | None |
| Propylene Glycol | 20% | Fail | None |
| Ethylene Glycol | 30% | Success | None |
| Propylene Glycol | 30% | Success | None |
| Ethylene Glycol | 40% | Success | None |
| Propylene Glycol | 40% | Success | None |
| Diethylene Glycol | 50% | Success | None |
| Triethylene Glycol | 50% | Success | None |
| Propylene Glycol | 60% | Success | None |

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.±37° F.), an intermediate numerical range of 43° F. to 81° F. (62±19° F.), and a narrow numerical range of 53° F. to 71° F. (62±9° F.). These broad, intermediate, and narrow numerical ranges should be applied not only to the specific values, but should also be applied to differences between these specific values. Thus, if the specification discloses a first pressure of 110 psia and a second pressure of 48 psia (a difference of 62 psi), the broad, intermediate, and narrow ranges for the pressure difference would be 25 to 99 psi, 43 to 81 psi, and 53 to 71 psi, respectively.

DEFINITIONS

As used herein, the term "gas hydrate" denotes an ice-like material containing an open solid lattice of water that encloses, without chemical bonding, light hydrocarbon molecules normally found in natural gas.

As used herein, the term "gas hydrate formation temperature" denotes the temperature at which an aqueous liquid that is in contact with natural gas containing 92 mole % methane, 5 mole % ethane, and 3 mole % propane at a given pressure initially changes from the liquid to the solid state to thereby form a gas hydrate. For example, as illustrated in FIG. 4, the gas hydrate formation temperature of distilled water at 2,000 psia can be about 28° F.; the gas hydrate formation temperature of a 1:3 mixture of monoethylene glycol (MEG) and distilled water at 2,000 psia can be about 57° F.; and the gas hydrate formation temperature of a 1:1 mixture of MEG and distilled water at 2,000 psia can be about 70° F.

As used herein, the terms "gas hydrate inhibitor" and "hydrate inhibitor" denote a composition that when mixed with an aqueous liquid produces a hydrate inhibited liquid mixture having a lower gas hydrate formation temperature than the original aqueous liquid.

As used herein, the term "drag reducer" denotes a composition that when added to a host fluid is effective to reduce pressure loss associated with turbulent flow of the host fluid though a conduit.

As used herein, the term "latex drag reducer" denotes a composition containing an aqueous liquid continuous phase and a dispersed phase comprising particles of a drag reducing polymer. When the drag reducing polymer of a latex drag reducer is formed by emulsion polymerization, the continuous phase of the latex drag reducer can be formed at least partly of the liquid employed for emulsion polymerization or the continuous phase can be formed of a liquid entirely different from the liquid employed for emulsion polymerization. However, the continuous phase of the latex drag reducer should be a non-solvent for the dispersed phase.

As used herein the term "average inside diameter" denotes the inside diameter of a conduit averaged along the length of the conduit.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A process comprising:

a) agitating a mixture in a substantially oxygen-free environment to produce an agitated emulsion, wherein the mixture comprises:
  i) water;
  ii) one or more surfactants;
  iii) a hydrate inhibitor; and
  iv) a monomer, b) polymerizing the monomer in the agitated emulsion using an initiator to generate free radicals and a catalyst, to form a hydrate inhibited latex drag reducer.

2. The process of claim 1, wherein the surfactant comprises both a high HLB anionic surfactant and a high HLB nonionic surfactant.

3. The process of claim 1, wherein the hydrate inhibitor is a polyhydric alcohol.

4. The process of claim 1 wherein the monomer is a methacrylate or acrylate monomer.

5. The process of claim 1, wherein the mixture contains a buffer.

6. The process of claim 5, wherein the buffer is used to maintain a pH in the emulsion from 6.5 to 10.

7. The process of claim 1, wherein the initiator for generating free radicals is selected from the group consisting of: persulfate, peroxy persulfates and peroxides.

8. The process of claim 1, wherein the amount of the hydrate inhibitor in the mixture is more than about 25 wt % of the continuous liquid phase of water and the hydrate inhibitor.

9. The process of claim 1, wherein the hydrate inhibited latex drag reducer does not globularize after a freeze/thaw cycle.

10. The process of claim 1, wherein the temperature for agitating the initiation solution occurs between the freezing point of the mixture to 50° C.

11. The process of claim 1, wherein the catalyst comprises of a transition metal having at least two oxidation states.

12. A process comprising:

a) agitating a mixture in a substantially oxygen-free environment to produce an agitated emulsion, wherein the mixture comprises:
  i) water;
  ii) a surfactant comprising a high HLB anionic surfactant and a high HLB nonionic surfactant;
  iii) at least about 25 wt % of a glycol in the carrier mixture of water and glycol;
  iv) a methacrylate or acrylate monomer; and
  v) an amount of buffer necessary to achieve a pH from 6.5 to 10 in the emulsion, wherein the agitation does not cause any precipitation and occurs between the freezing point of the mixture to 60° C., b) polymerizing the monomer in the agitated emulsion using an initiator and a catalyst, to form a hydrate inhibited latex drag reducer, wherein the hydrate inhibited latex drag reducer does not globularize after five consecutive freeze/thaw cycles.

* * * * *